(12) United States Patent
Beauchamp

(10) Patent No.: US 7,455,170 B2
(45) Date of Patent: Nov. 25, 2008

(54) CONVEYOR CHAIN LUBRICATION SYSTEM

(75) Inventor: Shaun M. Beauchamp, Pewaukee, WI (US)

(73) Assignee: Xact Fluid Solutions division of Behnke Lubricants, JAX USA, Menomonee Falls, WI (US)

( * ) Notice: Subject to any disclaimer, the term of this patent is extended or adjusted under 35 U.S.C. 154(b) by 0 days.

(21) Appl. No.: 11/560,038

(22) Filed: Nov. 15, 2006

(65) Prior Publication Data

US 2007/0137985 A1 Jun. 21, 2007

Related U.S. Application Data

(60) Provisional application No. 60/736,739, filed on Nov. 15, 2005.

(51) Int. Cl.
*B65G 45/08* (2006.01)
(52) U.S. Cl. ...................... 198/500; 184/15.1
(58) Field of Classification Search ................ 198/493, 198/500; 184/15.1, 15.3
See application file for complete search history.

(56) References Cited

U.S. PATENT DOCUMENTS

| | | | | | |
|---|---|---|---|---|---|
| 4,368,803 | A | * | 1/1983 | Dombroski et al. | 198/500 |
| 4,679,659 | A | * | 7/1987 | Jendick | 184/15.2 |
| 5,186,280 | A | * | 2/1993 | Mattcheck | 198/500 |
| 6,591,968 | B2 | * | 7/2003 | Snell et al. | 198/493 |

* cited by examiner

*Primary Examiner*—James R Bidwell
(74) *Attorney, Agent, or Firm*—Quarles & Brady LLP

(57) ABSTRACT

A lubrication system for delivering high temperature lubricant to a conveyor moving a foodstuff in a heated environment. The lubrication system determines the position of multiple wear points of the conveyor and the speed of the conveyor in order to lubricate the multiple wear points during operation of the conveyor. A single sensor is used to determine both the position of the wear points and the speed of the conveyor. The lubrication system is configured to lubricate the wear points while the conveyor is moving and the foodstuff is being heated. The lubrication system minimizes the amount of lubrication needed in accordance with the nonfood compound regulations for lubricants.

11 Claims, 7 Drawing Sheets

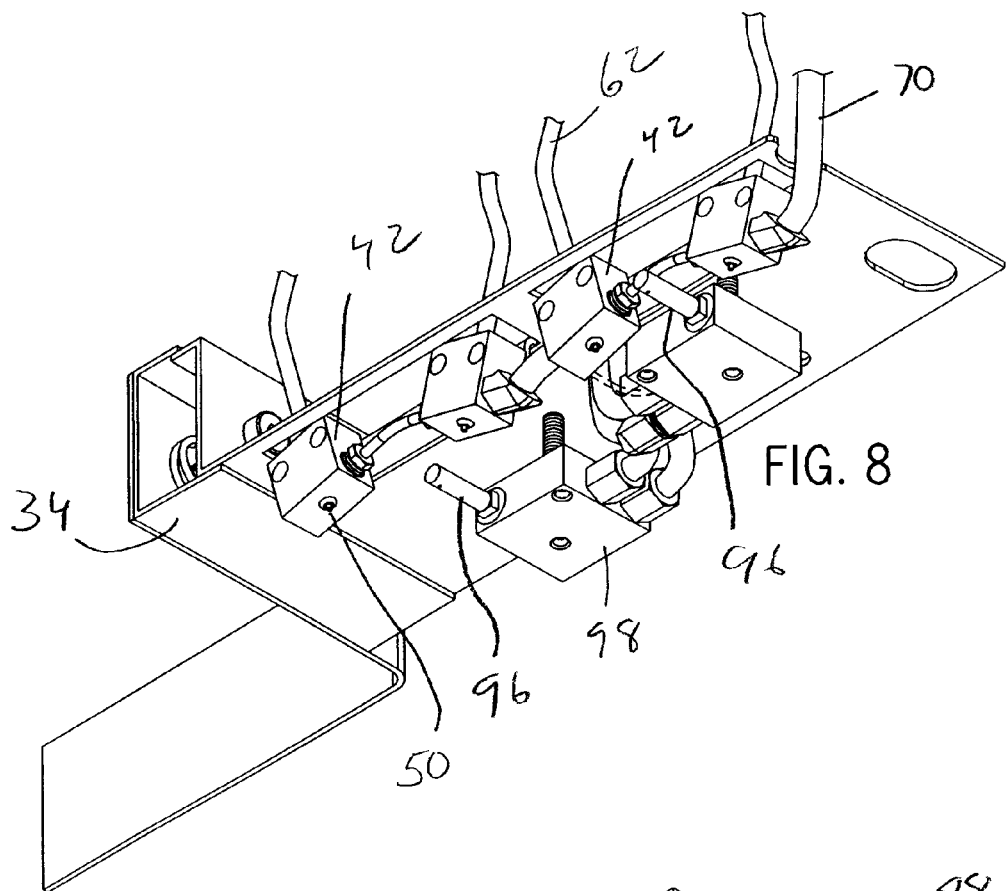
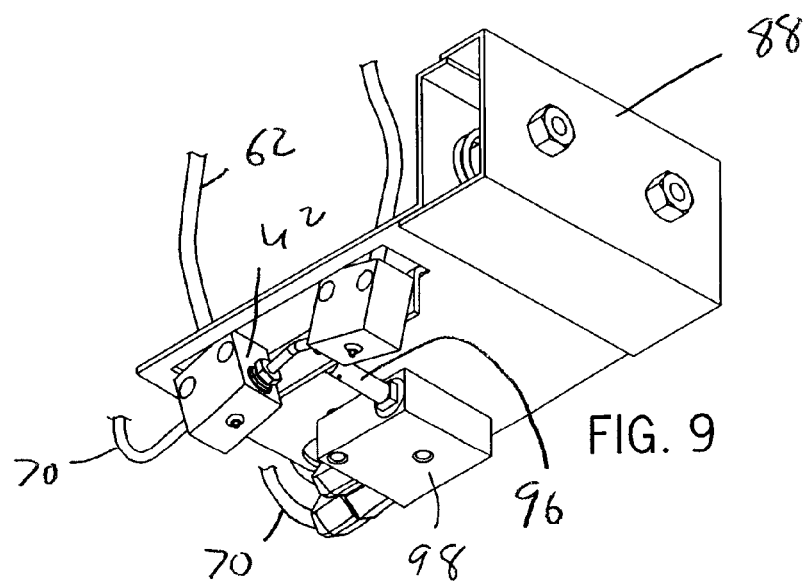

CONVEYOR CHAIN LUBRICATION SYSTEM

CROSS-REFERENCE TO RELATED APPLICATION

This is a non-provisional application based upon U.S. provisional patent application Ser. No. 60/736,739, entitled "OVEN LUBRICATION SYSTEM", filed Nov. 15, 2005.

STATEMENT CONCERNING FEDERALLY SPONSORED RESEARCH OR DEVELOPMENT

Not applicable.

FIELD OF THE INVENTION

The present invention relates generally to automated lubrication systems of conveyor chains particularly in a heated environment. More particularly, the present invention relates to a method and apparatus for lubrication of conveyor chains, especially, a commercial oven's conveyor chains, with high temperature synthetic food-grade lubricant.

BACKGROUND OF THE INVENTION

Commercial baking ovens for large volume baking are sometimes referred to as tunnel ovens. Trays of food products are circulated through the oven chamber (the tunnel) by conveyor system using endless chains connected to opposing lateral sides of the trays. The food products are typically baked using convection, conduction, radiation with turbulence, or some combination thereof. The combination of the high heat, in addition to the moisture which is evaporated from the food product as a result of the baking process, can create challenges relative to maintaining proper lubrication of the chains conveying the trays of products. Proper lubrication is critically important to oven maintenance as the conveyor chains could prematurely wear, and/or seize. Malfunction of the chains can create a serious oven failure with the attendant loss of productivity, cost of repair, and inconvenience.

Such ovens are traditionally lubricated with a graphite type lubricant. This lubricant is mixed with a carrier fluid and then applied to the chain when the oven has cooled to ambient temperature. The lubricant is applied manually with a spray applicator, and as the oven temperature rises, the carrier evaporates and the residual graphite lubricates the chain. There are several problems with this system. One problem is that the cooling of the oven requires oven downtime, which reduces the productivity and throughput of the oven equipment and corresponding return on investment. Another problem is that the graphite can end up collecting at various points in the oven which leads to an unclean worksite, and can end up in the products. Yet another problem with this method of lubrication is that it requires periodic scheduling of the oven downtime and the associated manual labor. The associated expense and loss of productivity are disincentives to proper routine maintenance of the conveyor. Failure to lubricate on a regular basis can lead to shortened equipment lifetime and/or equipment failure.

Lubricants used in food-processing machinery must be approved by the federal Food and Drug Administration because of the possibility that small amounts of such lubricants will contact the food. The U.S. Department of Agriculture (U.S.D.A.) Food Safety Inspection Service formerly certified lubricants suitable for use in food processing and handling plants. In 1999, NSF International® launched the NSF Nonfood Compounds Registration and Listing Program to provide an independent certification program to fill the void created by discontinuance of the U.S.D.A. list. All compounds that were on the U.S.D.A. list were carried over to the NSF program. Lubricants can be registered as NSF H1 or H2.

An NSF H1 lubricant is acceptable as a lubricant with incidental food contact (H1) for use in and around food processing areas. Such compounds may be used on food processing equipment as a lubricant for machine parts and equipment in locations in which there is a potential exposure of the lubricated part to food. The compounds must be formulated in compliance with 21 C.F.R. section 178.3570 and other sections referenced therein. The amount used should be the minimum required to accomplish the desired technical effect on the equipment.

An NSF H2 lubricant is acceptable as a lubricant where there is no possibility of food contact (H2) in and around food processing areas. Such compounds may be used as lubricants on equipment and machine parts in locations in which there is no possibility of the lubricant or lubricated part contacting edible products.

High production conveyor food ovens are severely extreme environments in terms of wear, corrosion and high temperature conditions. The conveyor drive chains in these baking ovens may require an NSF H1 lubricant because of the potential of exposure to edible products; however, many NSF H1 lubricants (e.g., mineral oil based lubricants) can not be used at the high operating temperatures typical of ovens. Synthetic lubricants can offer advantages over mineral oil based lubricants (e.g., chain cleanliness, low volatility and excellent anti-wear protection); however, it may be difficult to obtain NSF H1 registration for a synthetic lubricant capable of operating at high temperatures.

What is needed in the art is a method and apparatus for dispensing lubricant accurately to wear points located on a conveyor chain, or, which does not require downtime of the oven or other equipment and which can provide the lubrication automatically.

SUMMARY OF THE INVENTION

The present invention provides an automatic lubrication system for lubricating conveyor chains during operation of an oven. The automatic lubrication system can sense the position of one part of a single conveyor chain and control lubrication of a plurality of wear locations based on the sensed position of the one part. The wear locations can be on a plurality of different conveyor chains. The automatic lubrication system can dispense of minimal amounts of lubricant onto the wear locations in accordance with nonfood compound regulatory requirements.

In on aspect, the invention provides a lubrication system for delivering a high temperature lubricant to a conveyor used to transport foodstuff to an oven. The conveyor can be at least partially disposed in the oven and have at least one conveyor chain with a plurality of wear locations. The lubrication system can include at least one sensor positioned with respect to the conveyor to detect a prescribed element of the conveyor chain, at least one nozzle receiving the lubricant and positioned with respect to the conveyor to dispense the lubricant onto at least one of the plurality of wear locations after the sensor detects the prescribed element of the conveyor chain. The at least one of the wear locations can be at a different location than the prescribed element of the conveyor chain detected by the sensor.

The at least one of the wear locations can be positioned near the foodstuff when lubricant is dispensed onto the at least one of the wear locations so that the lubricant can incidentally contact the foodstuff. A minimum amount of lubricant can be dispensed in accordance with NSF nonfood compounds H1 regulatory requirements.

The conveyor can include a plurality of conveyor chains each including a plurality of wear locations and each of the plurality of wear locations can be at a different location than the prescribed element of the conveyor chain detected by the sensor. At least two of the plurality of wear locations of one of the conveyor chains can be positioned at different distances from the at least one sensor when the sensor detects the prescribed element of the conveyor chain.

A plurality of nozzles can dispense lubricants at different times.

The sensor can include a bifurcated fiber optic connected to a laser.

The oven can be heated to a temperature capable of baking the foodstuff.

The oven lubrication system can further include a bracket to which the nozzle and sensor are attached. The oven can include a lubrication access door and the bracket can be mounted to the oven adjacent the lubrication access door.

Another aspect of the invention provides an automated lubrication system for lubricating a moving conveyor at least partially disposed in an oven having an elevated temperature. The system can include a high temperature lubricant, a delivery system for delivering the lubricant to at least one moving wear location of the conveyor, and a control system for determining the location of the at least one moving wear location of the conveyor and selectively operating the delivery system to deliver lubricant to the at least one moving wear location only when the at least one moving wear location is at a prescribed location within the oven.

The moving conveyor can include a first chain and a second chain. The at least one moving wear location can be on the first chain and a further at least one moving wear location can be on the second chain. The control system can be configured to operate the delivery system to deliver lubricant to the further at least one moving wear location only when the further at least one moving wear location is at a second prescribed location within the oven.

The control system can include a sensor that detects an element of the moving conveyor. Delivery of lubricant to the at least one moving wear location can be based on the sensor sensing the element of the moving conveyor. The control system can also configured to determine a speed of the moving conveyor by monitoring the element of the moving conveyor and the delivery system can be operated to deliver lubricant to the at least one moving wear location based on the speed of the moving conveyor. The control system can be configured to operate the delivery system to deliver lubricant to a further at least one moving wear location a period of time after the delivery system has delivered lubricant to the at least one moving wear location. The period of time can be based on the speed of the moving conveyor.

The lubricant can be food grade lubricant.

Another aspect of the invention provides a method of automatically lubricating a moving conveyor at least partially disposed in an oven having an elevated temperature to prepare a foodstuff transported by the conveyor. The method including the steps of sensing a position of an element of the conveyor, determining a position of a wear point based upon the sensed position of the conveyor element, and dispensing a high temperature lubricant onto the wear point of the conveyor when the first wear point is positioned within the oven.

The lubricant can be dispensed onto the wear point so that the lubricant can incidentally contact the foodstuff.

A minimum amount of lubricant can be dispensed in accordance with NSF nonfood compounds H1 regulatory requirements.

The method can further including the step of determining a position of a second wear location based upon the sensed position of the conveyor element and dispensing the high temperature lubricant onto the second wear location when the second wear location is positioned within the oven.

The foregoing and other advantages of the present invention will be apparent from the following description. In the description that follows reference is made to the accompanying drawings which form a part thereof, and in which there is shown by way of illustration, and not limitation, expected preferred embodiments of the invention. Such embodiments do not necessarily represent the full scope of the invention, and reference should therefore be made to the claims herein for interpreting the scope of the invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 5A is a fragmentary rear view of the nozzles shown in FIG. 4;

FIGS. 8 and 9 shown in perspective view another embodiment of the brackets and nozzles according to the present invention.

Corresponding reference characters indicate corresponding parts throughout the several views. The exemplifications set out herein illustrate embodiments of the invention, in one form, and such exemplifications are not to be construed as limiting the scope of the invention in any manner.

DETAILED DESCRIPTION OF THE INVENTION

Figure 1:
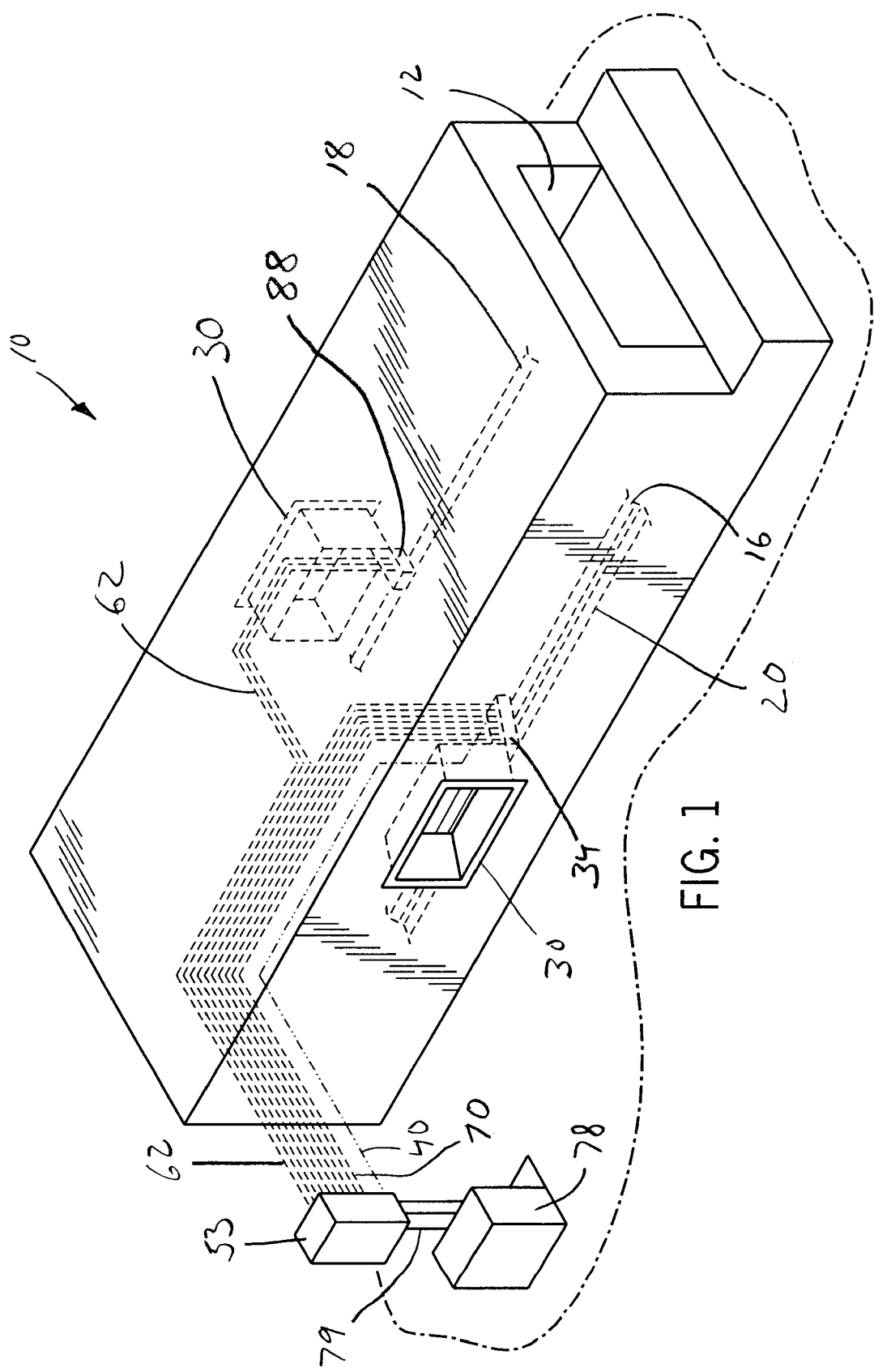
FIG. 1 is a perspective schematic view of an oven including a conveyor chain lubrication system according to the present invention.
Figure 2:
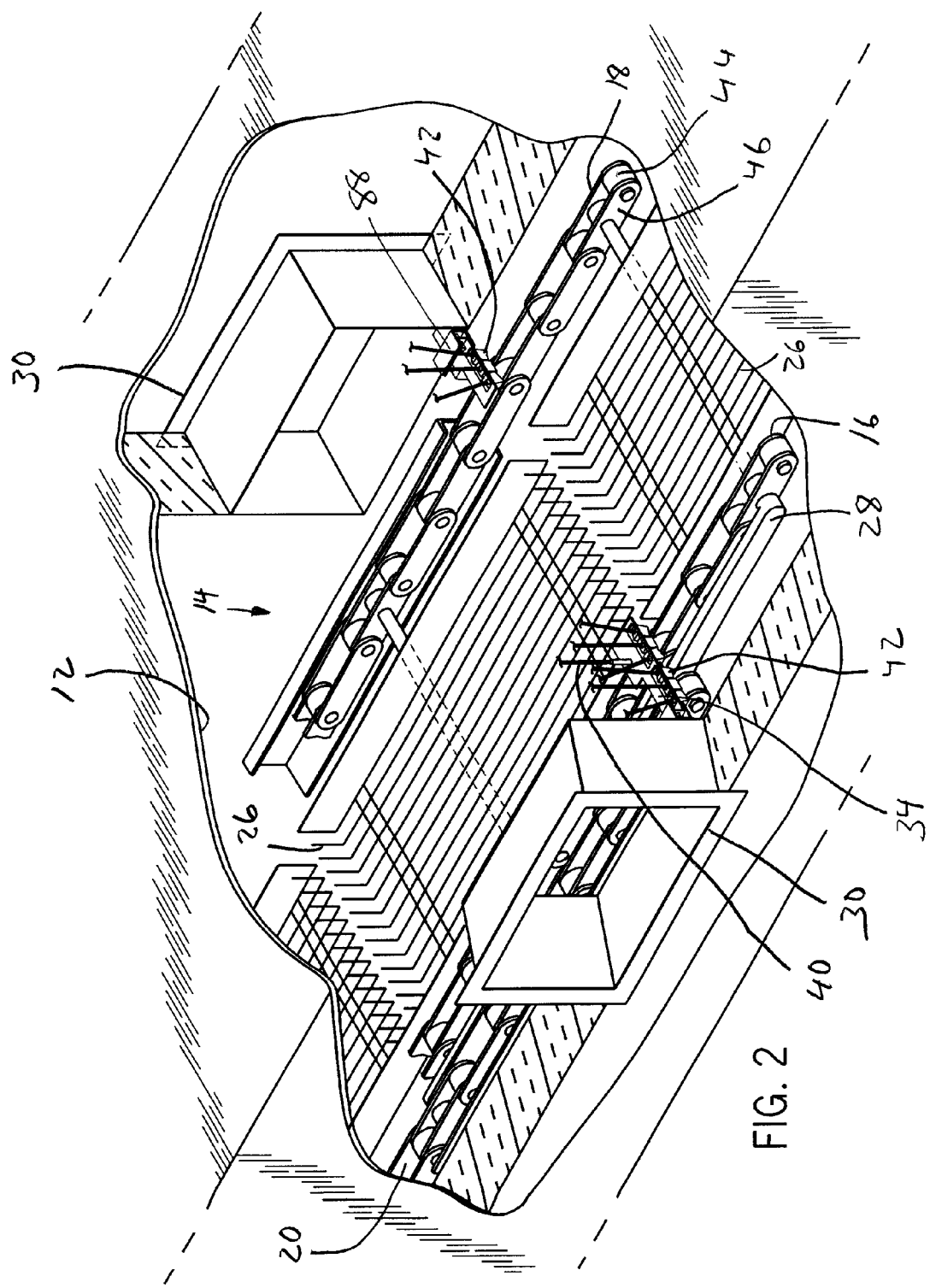
FIG. 2 is an enlarged fragmentary perspective of the oven of FIG. 1, showing particularly the conveyor chains in relation to the nozzles according to the present invention.
Figure 6:
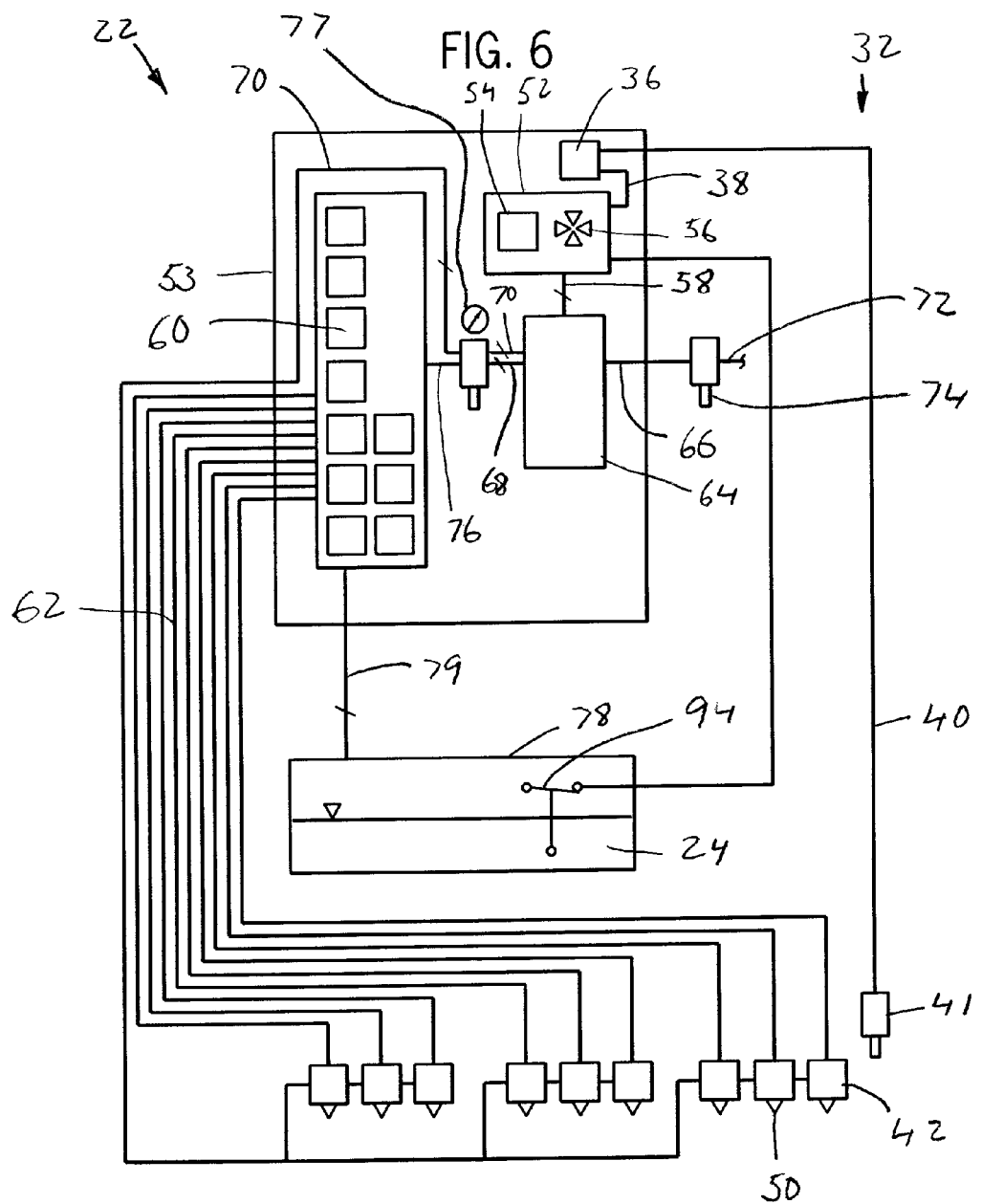
FIG. 6 is a schematic view of the lubrication system of FIG. 1.

Referring now to the drawings, and more particularly to FIGS. 1, 2 and 6, there is shown a heated environment such as oven 10, which can be a commercial tunnel oven for example, which generally includes a heated chamber 12, a chain driven conveyor 14 at least partially within heated chamber 12 and including at least one chain 16, 18, 20, and a lubrication system 22 connected to heated chamber 12. Lubrication system 22 lubricates one or more of chains 16, 18, 20 using lubricant 24.

In addition to the chains, chain driven conveyor 14 includes trays 26 on which baked products (not shown) are placed to be transported through heated chamber 12 during the baking process. Chains 16 and 18 move synchronously and are driven by sprockets (not shown) to convey trays 16, and associated baked products, through oven 10. Chain 20 is connected to Z-bar 28, which is a part of tray 26 and maintains the proper orientation of tray 16 as it is conveyed through oven 10. Although this embodiment shows three chains, the present invention can readily be adapted for use with one, two or more than three chains.

A typical oven 10 can operate at around 400° F., although the present invention is not limited by this temperature and can operate from room temperature or lower to 500° F. or higher, which range is typically limited by the characteristics of lubricant 24. Oven 10 can include lubrication access doors or apertures 30. The prior method of chain lubrication described previously requires that the oven be cooled to room temperature, and then a graphite based lubricant is applied by an operator to the chains. As the oven is reheated the carrier component of the graphite based lubricant evaporates, and although some of the graphite is deposited on the chains, other graphite particles flake off and collect on the floor of heated chamber 10. In addition to this disadvantage, the prior method of chain lubrication is labor intensive and can require a full shift, or longer, of oven shutdown. In contrast, the present invention can use a lubricant 24 which is a synthetic high temperature chain lubricant such as Pyro-Kote 220. High temperature means that the lubricant performs in temperatures above 100 degrees Fahrenheit, preferably within a range of 300-600 degrees Fahrenheit. Pyro-Kote 220 exhibits superior performance relative to critical performance characteristics for high-temperature chain lubricants. Specifically, Pyro-Kote 220 is formulated to be superior in each individual critical performance characteristic category of load carrying capability (anti-wear performance), resistance to evaporation (volatilization characteristics), thermal oxidative stability (varnish, sludge and depositing tendencies), and detergency characteristics (regenerative effect). Although the present invention can use a lubricant 24 such as Pyro-Kote 220 for a baking oven application, the present invention is not limited to such a lubricant as it can be adapted to a wide variety of lubricants 24 depending on the specific application of lubrication system 22.

Figure 3:
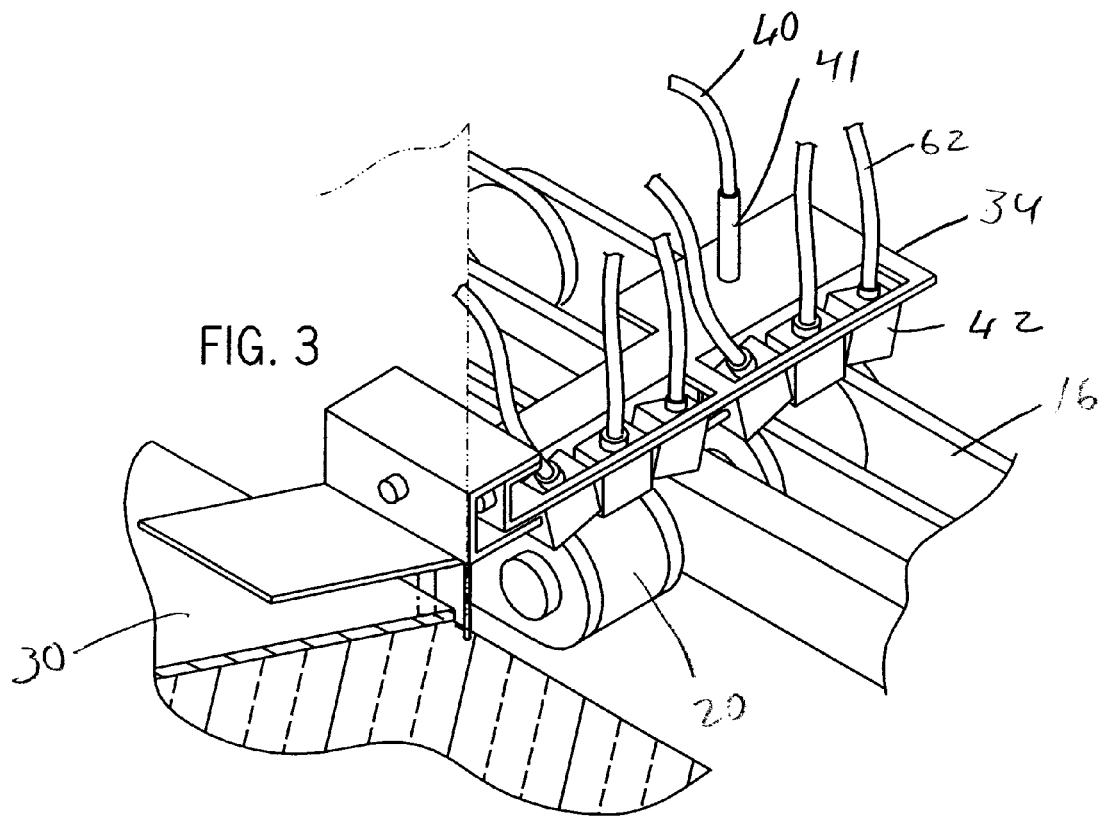
FIG. 3 is an enlarged fragmentary perspective of some of the nozzles of FIG. 2.
Figure 4:
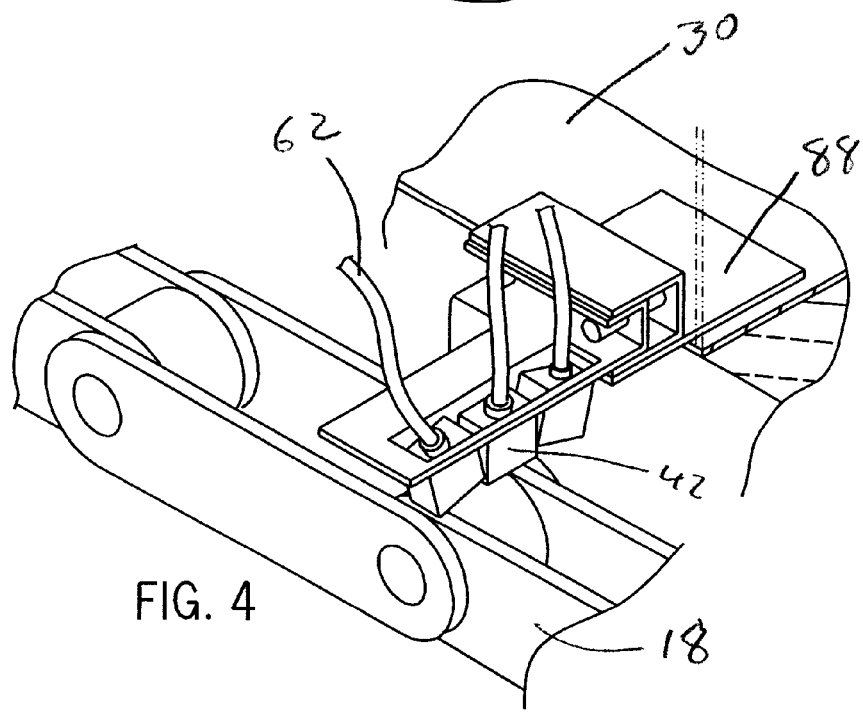
FIG. 4 is a fragmentary perspective of the other nozzles of FIG. 2.
Figure 5:
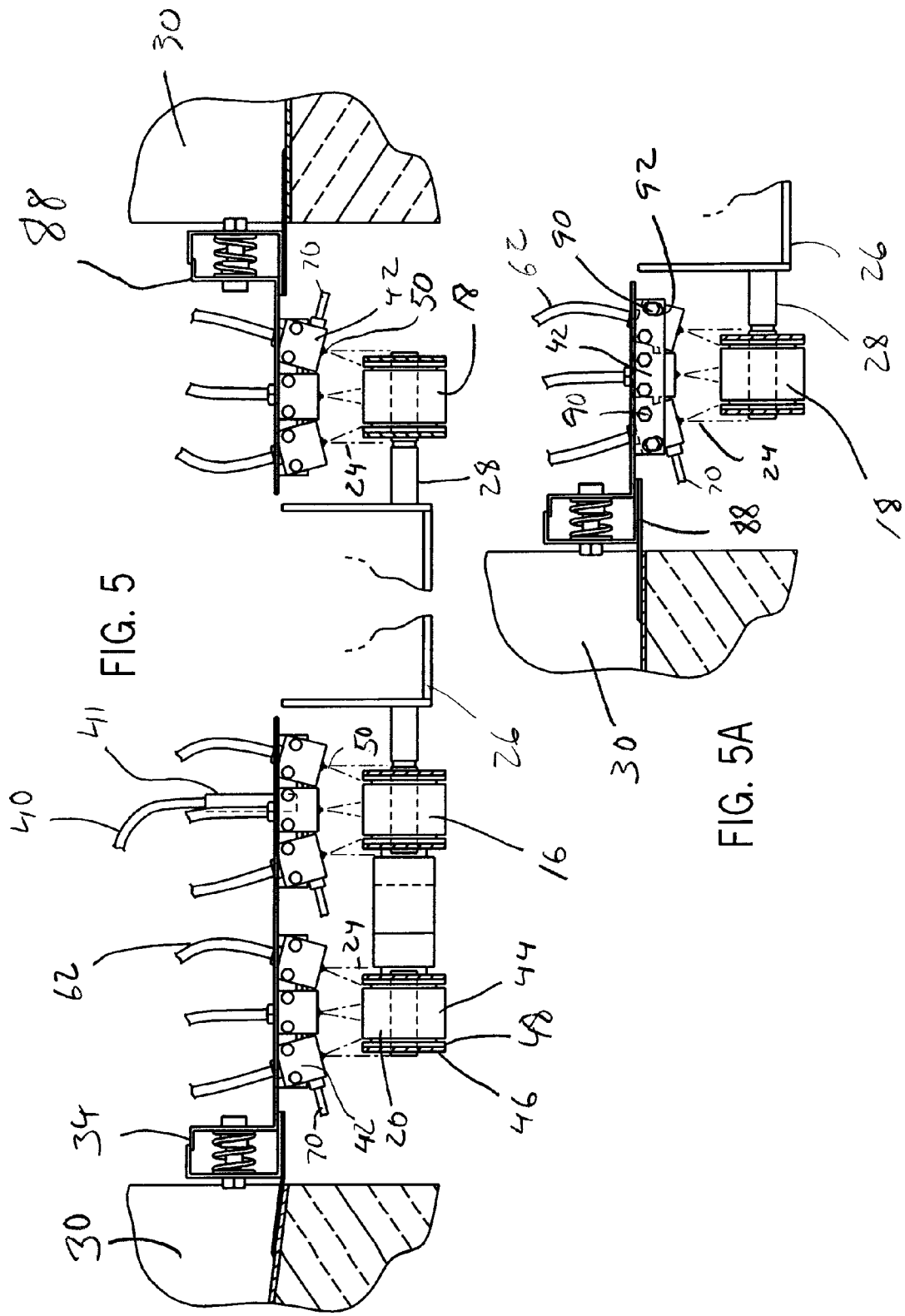
FIG. 5 is a fragmentary front view of the nozzles of FIG. 2.

Lubrication system 22 includes a sensor 32 which can be connected to heated chamber 12 particularly via bracket 34 (FIGS. 3-5), or by other elements. Sensor 32 can include a laser (or other photoelectric device) transmitter/receiver 36 for detecting an element of at least one of chains 16, 18, 20 and providing a detected output 38 using a bifurcated fiber optic 40 and transmitter/receiver 36. Fiber optic 40 can include a stainless steel sheath to protect it. Although other types of sensors 32 can be used, fiber optics can be constructed to survive in areas of corrosive materials and/or extreme moisture or heat. The low mass and size of the fibers allows a fiber optic assembly to withstand very high levels of shock and vibration, and be assembled unobtrusively in a lubrication system 22. Two examples of fiber optics are individual and bifurcated where in an individual type fibers are used in pairs in the opposed sensing mode. That is, one fiber transmits the light to the sensing location, while the other fiber returns the received light to the sensor. In contrast, bifurcated fiber assemblies are two-way fibers having a single sensing end, that both emits a sensing beam and receives reflected light, and dual control ends which attach separately to the transmitter/receiver 36. Bifurcated fibers can be used in the reflective sensing modes, diffuse mode, and also retroreflective and convergent modes. Further, glass fiber optic assemblies are available in a variety of sensing end styles which are compatible with the present invention. The small size and bending flexibility of fiber optic assemblies allows positioning and mounting in very tight areas. Sensor 32 can be a background suppression mode sensor which is designed to sense objects within a certain distance from the fiber optic head 41 while ignoring even shiny backgrounds.

At least one nozzle 42 is connected to heated chamber 12, or some other element of oven 10, and is located proximate to at least one of the chains 16, 18, 20 and provides lubrication 24 for at least one position of the chains. For example, the lubrication positions can include, but are not limited to Z-bars 28, rollers 44, links 46, bushings 48, and other chain elements. Nozzles 42 are precision nozzles which each include a nozzle orifice 50 for precision dispensing of lubricant 24.

A controller 52 is connected to sensor 32 and receives detected output 38, and controller 52 is ultimately connected to each nozzle 42, for actuating the nozzles 42 to expel lubricant 24 on to at least one position 28, 44, 46, 48, or other positions, of chains 16, 18, 20 based on detected output 38. Controller 52, and other elements, can be installed in and protected by enclosure 53, such as a NEMA 4X enclosure, and are connected to suitable electrical power mains, as is known. Controller 52 can include a display 54 and a user input device 56, for programming and status of controller 52, and can also include a microprocessor, application specific integrated circuit and/or other logic devices, relay outputs 58 and/or other output types, and other electronic/electrical components as required.

Lubrication system 22 further includes at least one positive displacement pump 60 which is fluidly connected to nozzles 42 to deliver lubricant 24 to nozzles 42, and in the embodiment shown, nine pumps 60 are individually connected to a corresponding nozzle 42 via high pressure tubing 62. At least one three-way solenoid valve 64 is electrically connected to controller 52, and is pneumatically connected to pumps 60. Three-way solenoid valves 64 are well known in the art, and can be used to separate a pressurized air input 66 into a first pressurized air output 68 and a second pressurized air output 70. Valve(s) 64 can be a single 3-way valve connected to the entire bank of pumps 60, or alternatively, multiple 3-way valves 64 each having corresponding outputs 68 and 70, individually connected to a corresponding pump 60, or multiple pumps. The exact configuration and number of valves 64 is determined by the application and installation of lubrication system 22 according to the present invention, and are particularly predetermined by the required configuration of pumps 60, and corresponding nozzles 42, were pumps 60 can be configured to operate in synchrony or separately, or some combination thereof. A source of pressurized air 72 can be provided to valve(s) 64 through filter 74. Controller 52 provides an electrical input(s) 58 to the solenoid(s) of valve(s) 64 which provide pneumatic input(s) 76 to pumps 60. Air regulator 77 can be used to regulate air pressure to pumps 60. When provided with pneumatic input(s) 76, pumps 60 are energized to draw lubricant 24 from reservoir 78 via one or more conduits 79, and into tubing 62, which fluid is conducted to nozzles 42 and expelled onto an appropriate chain 16, 18, 20.

Figure 7:
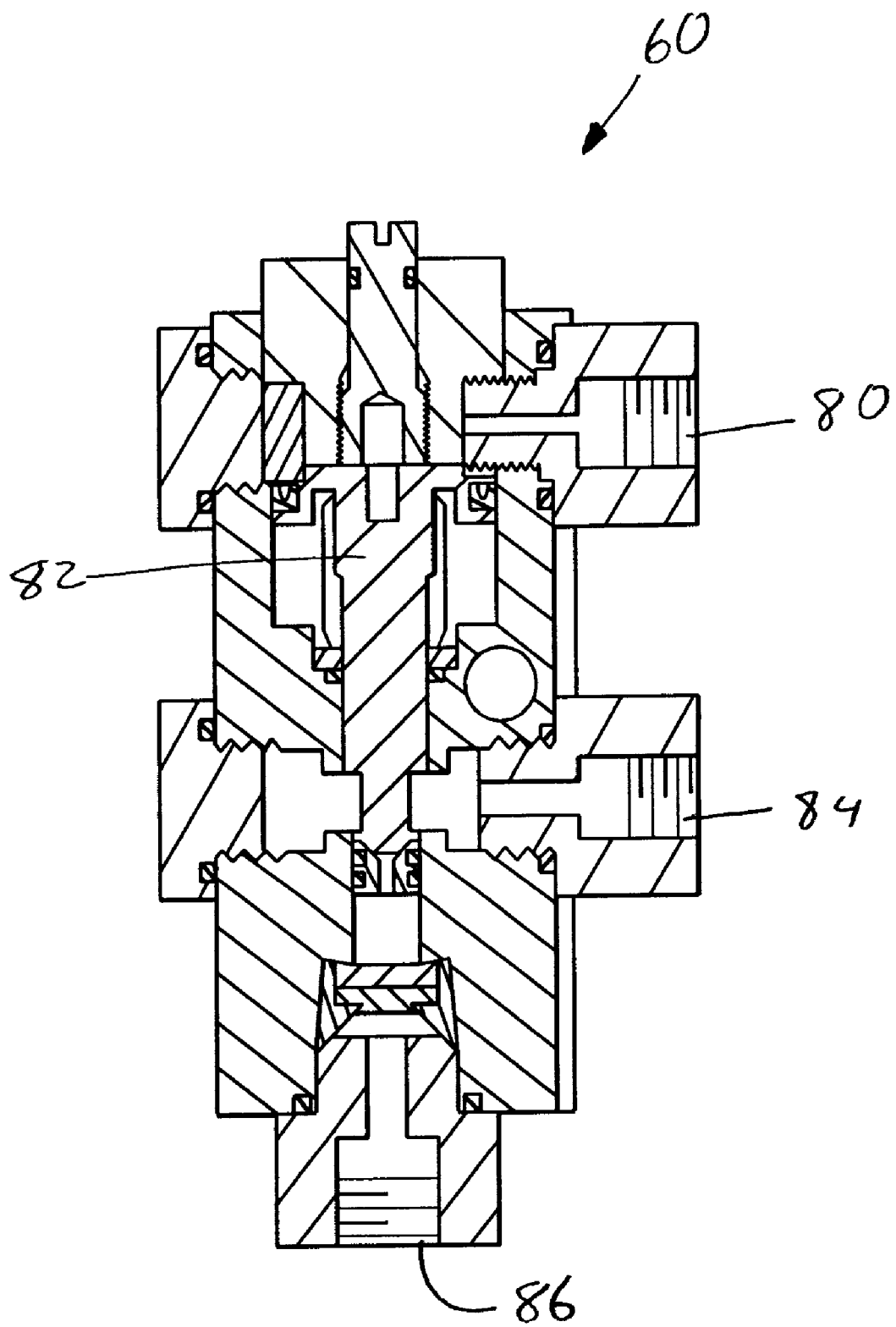
FIG. 7 is cross-sectional view of a positive displacement pump according to the present invention.

FIG. 7 illustrates an embodiment of a positive displacement pump 60 according to the present invention. Pressurized air at air inlet 80 pneumatically actuates pump piston 82. Lubricant 24 is connected to liquid inlet 84, and through the reciprocating action of piston 82, a fixed volume of fluid 24 is metered and dispensed from inlet 84 to a discharge zone or outlet 86. The pump internal wear elements are located within the fluid passages such that the pump is self-lubricating; and therefore is highly reliable. For each pump 60, inlet 80 is connected to a pneumatic input 76, liquid inlet 84 is fluidly connected to conduit 79, and outlet 86 is connected to tubing 62.

The present invention provides a "point and shoot" design which allows for lubrication of the physically detected target (chain position) without the need for additional timing or delayed lubrication. The detected position can be distanced from the lubrication location. For example, sensor 32 provides a 500 microsecond output which communicates chain position to the programmable logic relay 52. In 10 milliseconds, the relay recognizes the input signal and establishes the program desired output. Output from the relay occurs at 58 in an additional 10 milliseconds, electrifying the three-way solenoid valve 64. Powered, solenoid valve 64 allows air to flow to at least one pneumatic pump 60. Activation of pump 60 allows the internal piston 82 to dispense fluid 24 to the pump fluid outlet port 86. With the pump output set (0.012 cu. in., for example) and using 120 psi air supply with AW 36 hydraulic lubricant fluid as a dispensed medium, the output time from solenoid 64 activation to dispensed lubricant 24 is 45 milliseconds. The relatively instantaneous (0.07 seconds) output of lubrication system 22 allows for physical lubrication of the detected target. Due to the nature of fluid dynamics, some variance of this timing may occur. Limitations on how rapidly system 22 can fire are a function of desired fluid 24 output. At full stroke, typical fluid 24 delivery can occur as frequently as three times per second. Alternatively, with the fluid volume set a ⅙ stroke, up to ten activations per second are achievable, for example.

The second output 70 of solenoid valve 64 is fluidly connected to nozzles 42, which air pressure input helps atomize the spray of lubricant 24 exiting each of orifices 50. Nozzles 42 are mounted on bracket 88, along with bracket 34, using fasteners 90, and provide a directional positioning of nozzles 42 via slots 92, for example. The combination of fast reaction time, metered lubricant 24 volumes, and accurate directional control of nozzles 42 allows lubrication system 22 to provide superior automated lubrication performance, particularly in environments which are not easily accessed during the operation of the equipment.

Providing that level switch 94 indicates that there is sufficient lubricant 24 in reservoir 78, system 22 indicates an operational status on display 54 and an indicator light (not shown) will illuminate. In the event that level switch 94 indicates insufficient lubricant 24 in reservoir 78 flashing output is indicated alerting the operator of a lubricant 24 low level.

When sensor 32 is activated, a looped logic circuit gathers the time between sensor 32 input changes. For example, sensor 32 can be set to detect rollers 44. Controller 52 records the time between state changes of sensor 32. Once the period between activations of sensor 32 is consistent, i.e. indicating a constant chain speed, the lubricator 22 activates pumps 60 lubricating the appropriate chain rollers 44, or other chain elements.

Typically chains 16 and 18 are synchronous due to a shared physical drive and corresponding sprockets. Fluid 24 is delivered to preselected nozzles 42 on these chains through a relay output 58 to one solenoid input which controls a bank of six lubrication pumps. In at least one embodiment (see FIGS. 8 and 9), of the six lubrication pumps, four pumps deliver fluid directly to brass nozzle outputs and two pumps deliver fluid to lubricating stainless internal mix nozzle tubes 96 of nozzles 98 according to the present invention. Tubes 96 can be used to provide lubrication to a chain component through an access hole, for example.

The present invention can detect different points on chain 16 and apply lubricant 24 selectively. For example, sensor 32 can detect rollers 44, but can also detect Z-bar 28 using logic in controller 52 as the distance between a roller 44 and a Z-bar 28 is approximately half of the distance between two rollers 44. Activation of appropriate relays 58, and corresponding valves 64, and pumps 60, along with positioning of nozzles 42, allows selective lubrication of various positions of the chains.

Further, lubrication system 22 provides options for the number of chain revolutions between lubrication cycles. Logic within controller 52 allows for lubrication of a predetermined number of pins on the chain and a skip cycle of a predetermined number of pins. This allows for lubrication of the chain every 1, 2, 3, etc. passes through the oven. Lubrication at 440° F. is recommended no less than every 80 minutes, for example. With an average bake cycle of eight minutes, for example, no more than a nine pass skip cycle is recommended.

Provided lubricant 24 remains at a level to support the float switch 94, the system 22 continues with no physical status change. If reservoir 78 is sufficiently depleted, display 54 indicates a low lubricant 24 level, and helpful corrective information is also displayed.

The present invention is not limited to baking oven systems, and is particularly useful for, and adaptable to, lubricating moving conveyor chains in environments in which there is limited access to the conveyor chains during normal operation of the equipment. Other examples of systems in which the present invention could lubricate associated conveyor chains include, but is not limited to, heat treating ovens, sintering chambers, and powder coating curing ovens. Further, the present invention does not necessarily need to be used in a heated environment, although the need for the present invention tends to increase in such environments as the heat tends to evaporate, or otherwise degrade, conveyor chain lubrication, and chain components in general. The present invention can also be applied to chains in a caustic environment such as a plating shop, or in other hazardous applications, such as a conveyor which transports radioactive material. The present invention is also suitable for outdoor application such as conveyor chains used in conveyors at grain elevators to convey grain, or coal fired power plants conveyors which convey coal. The present invention can also be applied to agricultural equipment, such as a combine, which is exposed to outdoor conditions the dust (grain and soil) generated by harvesting.

An advantage of the present invention is that it can dispense lubrication to a conveyor in an oven, or other heated environment, while the oven is operating at full temperature and the conveyor moving, as in normal operation of the oven.

Other advantages of the present invention are that it provides positively displaced lubricant volume and a rapid response of delivery.

Yet another advantage of the present invention is that it can be retrofitted to existing oven installations.

Yet another advantage of the present invention is that it dispenses lubricant specifically to wear points.

Yet another advantage of the present invention is that it minimizes the use of lubricant.

Yet another advantage of the present invention is that it minimizes the amount of lubricant need to the minimum required to lubricate the conveyor equipment according to Yet another advantage of the present invention is that it provides improved wear protection for the oven conveyor, or other conveyor equipment.

Yet another advantage of the present invention is that it minimizes or eliminates depositing of lubricants and/or lubricant byproducts in the oven chamber, particularly at unwanted locations.

Yet other advantages of the present invention are that it increases conveyor chain reliability and useful life.

Yet other advantages of the present invention are that it provides improved air and environmental quality.

Yet other advantages of the present invention are that it provides improved operating efficiencies and lower operating costs.

Yet another advantage of the present invention is that it reduces maintenance of the oven system.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A lubrication system for delivering a high temperature lubricant to a conveyor used to transport foodstuff to an oven, the conveyor being at least partially disposed in the oven and having at least one conveyor chain with a plurality of wear locations, the lubrication system comprising:
   at least one sensor positioned with respect to the conveyor to detect a prescribed element of the conveyor chain;
   at least one nozzle receiving the lubricant and positioned with respect to the conveyor to dispense the lubricant onto at least one of the plurality of wear locations after the sensor detects the prescribed element of the conveyor chain;
   wherein the at least one of the wear locations is at a different location than the prescribed element of the conveyor chain detected by the sensor;
   wherein the at least one of the wear locations is positioned near the foodstuff when lubricant is dispensed onto the at least one of the wear locations so that the lubricant can incidentally contact the foodstuff.

2. The lubrication system of claim 1, wherein a minimum amount of lubricant is dispensed in accordance with NSF nonfood compounds H1 regulatory requirements.

3. The lubrication system of claim 1, wherein the conveyor includes a plurality of conveyor chains each including a plurality of wear locations, wherein each of the plurality of wear locations is at a different location than the prescribed element of the conveyor chain detected by the sensor.

4. The lubrication system of claim 3, wherein at least two of the plurality of wear locations of one of the conveyor chains are positioned at different distances from the at least one sensor when the sensor detects the prescribed element of the conveyor chain.

5. The lubrication system of claim 1, wherein a plurality of nozzles dispense lubricants at different times.

6. The lubrication system of claim 1, wherein the sensor includes a bifurcated fiber optic connected to a laser.

7. The lubrication system of claim 1, wherein the oven is heated to a temperature capable of baking the foodstuff.

8. The lubrication system of claim 1, further comprising a bracket to which the nozzle and sensor are attached, wherein the oven includes a lubrication access door and the bracket is mounted to the oven adjacent the lubrication access door.

9. A method of automatically lubricating a moving conveyor at least partially disposed in an oven having an elevated temperature to prepare a foodstuff transported by the conveyor, the method comprising:
   sensing a position of an element of the conveyor;
   determining a position of a wear point based upon the sensed position of the conveyor element; and
   dispensing a high temperature lubricant onto the wear point of the conveyor when the first wear point is positioned within the oven, wherein the lubricant is dispensed onto the wear point so that the lubricant can incidentally contact the foodstuff.

10. The method of claim 9, wherein a minimum amount of lubricant is dispensed in accordance with NSF nonfood compounds H1 regulatory requirements.

11. The method of claim 9, further comprising determining a position of a second wear location based upon the sensed position of the conveyor element and dispensing the high temperature lubricant onto the second wear location when the second wear location is positioned within the oven.

* * * * *